United States Patent [19]

Roberts

[11] 3,895,419

[45] July 22, 1975

[54] CROSS CHAIN HOOK

[75] Inventor: Alfred M. Roberts, York, Pa.

[73] Assignee: Campbell Chain Company, York, Pa.

[22] Filed: Jan. 30, 1974

[21] Appl. No.: 437,834

[52] U.S. Cl. ............... 24/230.5 CR; 152/241
[51] Int. Cl. ............... A43c 11/08; A44b 13/00
[58] Field of Search. 152/241; 24/230.5 CR, 68 TT, 24/69 TT, 230.5 SS, 73 AC, 73 CE, 230.5

[56] References Cited
UNITED STATES PATENTS

| 841,164 | 1/1907 | Mattassi | 24/230.5 CR |
| 1,494,289 | 5/1924 | Round | 24/230.5 CR |
| 2,825,381 | 3/1958 | Eddy | 152/241 |
| 3,044,521 | 7/1962 | St. Pierre | 24/230.5 CR |
| 3,548,909 | 12/1970 | Sandey | 152/241 |
| 3,668,746 | 6/1972 | Gower | 24/230.5 CR |

Primary Examiner—Geo. V. Larkin
Attorney, Agent, or Firm—Donnelly, Maky, Renner & Otto

[57] ABSTRACT

A hook for connecting a pair of chain links each having a predetermined cross-sectional diameter includes an enlarged head having a shank extending therefrom and merging into a reversely curved bowl which merges into a hook end portion spaced from the shank to define a throat having a width greater than the predetermined diameters of either chain link but less than their combined diameters so the links cannot pass one another in the throat. The interior of the bowl has a width greater than such combined diameter so the links can pass one another only within the bowl for assembly or disassembly of the chain links.

9 Claims, 5 Drawing Figures

PATENTED JUL 22 1975 3,895,419
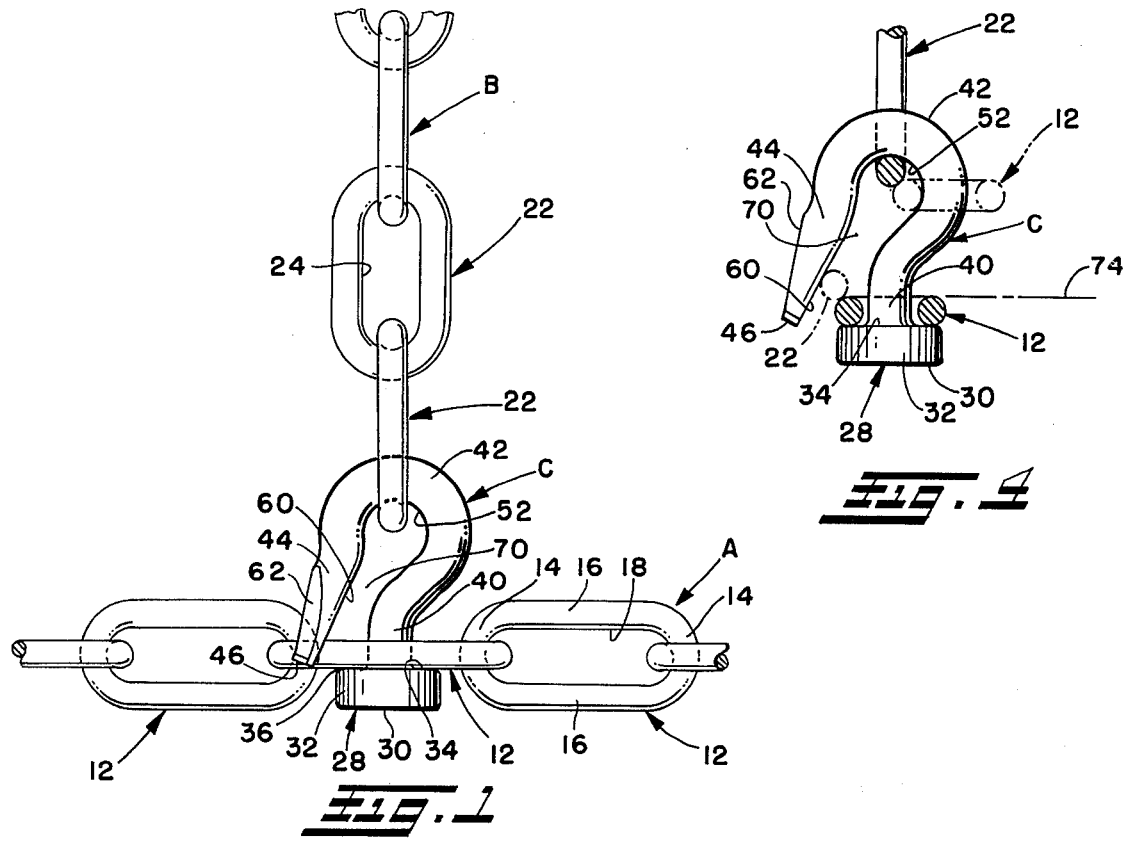
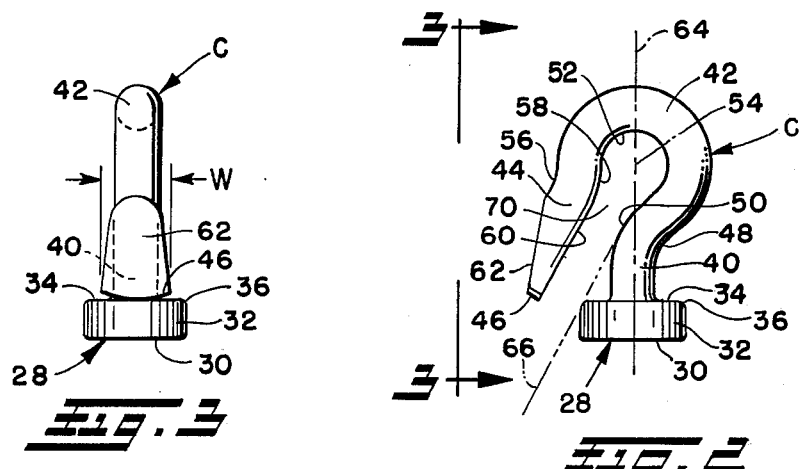
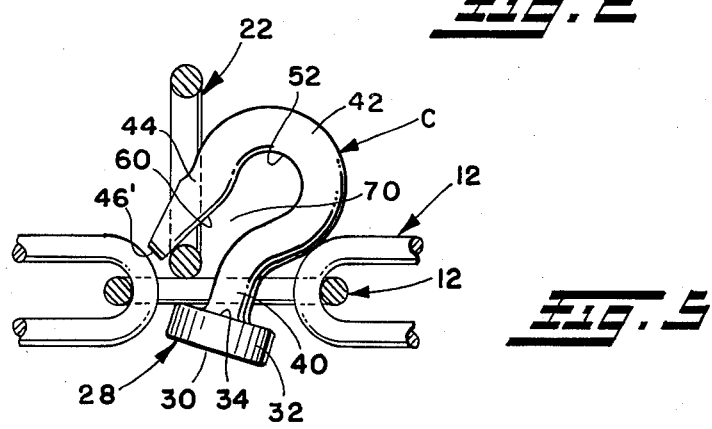

CROSS CHAIN HOOK

BACKGROUND OF THE INVENTION

This application pertains to a hook for connecting chain links, and more particularly to a hook for connecting cross chains with side chains in a tire chain.

Chains for use on rubber tires commonly include a pair of circumferential side chains positioned against the tire sidewalls and circumferentially spaced cross chains extending across the tire tread between the side chains. The connections between the cross chains and side chains are desirably of a type which makes initial assembly at the factory very simple, while minimizing the possiblity of unintentional disassembly during handling or use of the tire chain. At the same time, the connections must be of a type which permit easy disassembly and reassembly in the field of replacement of broken cross chains.

Hooks are often used for thus connecting the cross and side chains, and such hooks include enlarged heads bearing against a side chain link, with the hook shank received through the side chain link and a cross chain link received in the loop or bight of the hook. The loops of the hooks are sometimes bent substantially closed at the factory after assembly of the links in order to prevent unintentional disassembly during handling or use of the chains. Special tools are then required to open and close the hooks in the field for replacement of broken cross chains and such tools are not always readily available. Opening of the hook to remove a broken cross chain and then bending it closed after installing a new cross chain is difficult and very time consuming, especially under adverse weather conditions, for example.

In order to eliminate the necessity of bending the loops of the hooks closed for preventing unintentional disassembly, many auxiliary retaining devices have been proposed for such hooks, including spring-biased or elastomeric retainers, or clasps. Such auxiliary retaining devices significantly increase the cost of the hooks and frequently become broken or otherwise damaged during use of the chains so they are relatively ineffective.

Other proposals include hooks which are dimensioned and shaped relative to the chain links so that rotation of the hooks 90° and tilting thereof relative to the side chain links makes it possible to assemble or disassemble a cross chain link. In the normal position of the hook relative to the side chain link, there is insufficient clearance for disassembly of a cross chain link. In this type of arrangement, the hook often rotates and tilts during unmounted handling or use of the chain and unintentional disconnection can be and has been experienced.

SUMMARY OF THE INVENTION

A hook for connecting a pair of chain links includes an enlarged head having a shank extending therefrom and merging into a reversely curved bowl which merges into an end portion spaced-apart from the shank to define a narrow throat leading to the interior of the bowl. The interior of the bowl and the throat are dimensioned so the links can pass one another only within the bowl and not in the throat. This dimensional relationship minimizes accidental disassembly of the links from the hooks during handling or use of a tire chain incorporating such chain link and hook structure.

It is a principal object of the present invention to provide an improved hook for connecting a pair of chain links.

Another object of the invention is to provide an improved hook for connecting a pair of chain links to substantially eliminate accidental disassembly of the links during handling or use of chains having the links therein.

An additional object of the invention is to provide an improved hook for connecting a pair of chain links in such a manner that accidental disassembly is minimized, while maintaining ease of intentional disassembly and initial assembly without requiring special tools, bending operations, or supplemental retainers.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

BRIEF DESCRIPTION OF THE DRAWING

FIG. 1 is an elevational view showing a pair of chains connected together with the hook of the present invention;

FIG. 2 is a side elevational view of the hook of the present invention;

FIG. 3 is an elevational view looking generally in the direction of arrows 3—3 of FIG. 2;

FIG. 4 is a side elevational view of the hook of the present invention showing sections of two chain links to demonstrate the normal operating positions thereof with respect to the hook with two chain links also being shown in phantom to demonstrate relative geometrical relationships between the hook and two chain links; and FIG. 5 is an elevational view of a slightly modified form of hook to permit such hook to swivel through 360°, such hook being illustrated in a tilted and rotated position to show how unintentional disassembly is similarly prevented.

DESCRIPTION OF A PREFERRED EMBODIMENT

FIG. 1 shows a pair of chains A and B positioned at substantially 90° to one another and connected by hook C constructed in accordance with the present invention. Although hook C has uses for connecting other chains, its principal use is for connecting cross chains to side chains in a tire chain. For such use, chain A comprises a circumferential side chain which is normally positioned against the sidewall of a tire, while chain B comprises a cross chain which extends across the tread of the tire and is connected by another hook to a circumferential side chain positioned against the other sidewall of the tire. In a tire chain of the type described, there are of course normally a plurality of cross chains B circumferentially-spaced and positioned parallel to one another.

The dimensions of hook C will vary depending upon the cross-sectional dimensions of the chain links with which such hook is used and an illustrative example of a certain size hook will be given with respect to certain sizes of chain links. It will be recognized that the illustrative dimensions may vary somewhat and the hook dimensions will be substantially larger or smaller for use with larger or smaller chain links than in the specific example given.

Side chain A includes a plurality of interconnected individual links 12, each of which is made from a short length of stock having a diameter of approximately three-sixteenths inch and bent to the shape illustrated with its ends welded together. Each link 12 includes opposite smoothly curved end portions 14 connected by parallel spaced-apart side portions 16. Opening 18 in each link 12 is around five-sixteenths inch wide across the interior surfaces of side portions 16 and around 1¼ inches long across the interior surfaces of curved portions 14.

Chain B is also made from a plurality of interconnected individual links 22, each of which is made from a length of stock having a diameter of around seven thirty-seconds inch and being bent to the shape shown with its ends welded together. Each cross chain link 22 may be twisted in a known manner as is conventional for cross chains on a set of tire chains and may also have lug rods welded thereacross. The dimension of opening 24 in cross chain link 22 is relatively unimportant, the only criteria being that it is large enough for receiving hook C therethrough. In addition, the diameter of the stock from which each link 22 is made is related to the diameter of the stock for each link 12 to cooperate with the shape and dimensioning of hook C.

Hook C includes an enlarged generally cylindrical head 28 having a thickness of approximately one-fourth inch and including a flat outer surface 30, a cylindrical side surface 32 with a diameter of approximately eleven-sixteenths inch, and a generally flat link supporting surface 34 intersecting side surface 32 at a peripheral edge 36.

A cylindrical shank 40 having a diameter of approximately nine thirty-seconds inch is centrally located on head support surface 34 and extends therefrom to merge with a reversely curved bowl 42. Such bowl 42 in turn merges into a terminal hook portion 44 spaced outwardly from shank 40, such terminal hook portion having its arcuately configured end 46 lying substantially in a common plane with head support surface 34 as best shown in FIG. 3.

Hook C is bent so that outer curve 48 having a radius of approximately seven thiry-seconds inch begins approximately seven thirty-seconds inch along shank 40 from head support surfaces 34. Inner curve 50 then has a radius of approximately one-half inch beginning at approximately the same distance along shank 40 from head support surface 34 and merging into bowl interior 52 which is curved on a radius of approximately seven thirty-seconds inch about center 54. Outer curve 56 having a radius of approximately seven thirty-seconds inch extends between bowl 42 and terminal end portion 44. Inner curve 58 extends between bowl interior 52 and a flattened straight inner surface 60 on terminal hook portion 44 which also has a flattened outer surface 62. Flattening of terminal hook portion 44 is such that it has a width W somewhat greater than the diameter of the hook. Starting at end 46, flattened outer surface 62 diverges from flattened inner surface 60 at an angle of around 30° so that it is easier to position chain links on the hook.

Center of curvature 54 for bowl interior 52 also lies on center line 64 of shank 40. A line 66 tangent to the midpoint of inner curve 50 is also tangent to peripheral edge 36 of support surface 34, and flattened inner surface 60 extends parallel to such line 66 and is spaced approximately one-fourth inch therefrom. The space between the midpoint of inner curve 50 and the area where curve 58 merges into straight inner portion 60 defines a narrow throat 70 and in general this narrow throat may be considered to be located between shank 40 and terminal hook portion 44. The distance from head support surface 34 along center line 64 to the bottom of bowl interior 52 is approximately 1-1/32 inches.

For purposes of description, reference to links 12 and 22 as having a predetermined diameter or a certain diameter is intended to mean the diameter of the bar stock from which such links are formed. Although links 12 and 22 have a slightly different diameter in the example given, it will be recognized that such links can have the same diameter or differ to a larger extent than in the example. In any event, links 12 and 22 each have a predetermined diameter, which may be the same or different, and together have a combined diameter. Reference to the combined diameter of such links is intended to means a dimension equal to the diameter of the bar stock from which the link 12 is formed plus the diameter of the stock from which link 22 is formed.

Throat 70 has a width which is greater than the predetermined diameter of each link and less than the combined diameter of such links. The interior of bowl 42 has a width slightly greater than the combined diameters so that links 12 and 22 can pass one another only within the interior of bowl 42 and not within throat 70.

In assembling a pair of chains, hook C is first extended through a link 12 until such link is within the interior of bowl 42 as shown in phantom in FIG. 4. Hook C is then extended through a link 22 until such link is also positioned within the interior of bowl 42 adjacent link 12 whereupon link 12 is moved along the shank of the hook from the phantom line position until it is positioned around shank 40 in contact with head support surface 34 as shown in FIG. 4. Link 22 of a cross chain is then in its position of use within the interior of bowl 42. With link 12 so positioned around shank 40 and against head support surface 34, the distance between such link 12 and inner flat surface 60 of hook end portion 44 is less than the predetermined diameter of link 22 so that link 22 cannot be removed from the hook or unintentionally dislodged therefrom as shown by the phantom showing of link 22. In handling the tire chain, or during use thereof, link 12 may move along shank 40 away from head support surface 34. However, in all such positions of link 12 up to the interior of bowl 42, cross link 22 cannot pass link 12, so that unintentional disassembly is substantially eliminated. At the same time, initial assembly of a pair of chains with the hook is very simple as previously described. Also, it is very simple to disassemble the chains for replacement of a cross chain or the like sequentially by disconnecting the side chain, shifting side link 12 to the phantom position within the interior of bowl 42 and then moving cross link 22 from its solid line position toward the phantom position and off the hook. Assembly of a new cross chain is then carried out in the same manner as initial assembly.

With side chain link 12 positioned around shank 40 against head support surface 34, such link 12 extends along shank 40 from head support surface 34 a predetermined distance corresponding to the diameter of link 12 up to what may be termed a swivel line 74 in FIG. 4. Such swivel line 74 establishes a plane past which arcuate end 46 cannot extend if hook C is to be capable of swivelling 360° about the axis of shank 40 relative to link 12. In the preferred arrangement, end 46 of terminal hook portion 44 extends past such swivel line 74 toward head support surface 34 so that the opposite sides of hook end portion 44 adjacent terminal end 46 will strike against a side portion 16 of link 12 for limiting swivel movement of hook C to less than 180°. Hook C may then be assembled with chains A and B so that hook end portion 44 will face outwardly from the sidewall of a tire and will be incapable of rotating past link 12 thereby to preclude portion 44 from facing the tire sidewall.

In the preferred arrangement, end 46 extends at least to lie in a common plane with head support surface 34 so that hook C cannot be tilted and rotated for moving hook end 46 past a side portion 16. That is, hook end 46 extends sufficiently close to head 28 that it cannot be tilted and rotated to the position shown in FIG. 5. With this in mind, FIG. 5 shows a slightly alternative arrangement wherein hook end 46' terminates short of swivel line 74. That is, the distance along shank 40 from head support surface 34 to end 46' is slightly greater than the diameter of side link 12 so that hook C of FIG. 5 can swivel 360° about the axis of shank 40 relative to link 12. Aside from being capable of swivelling 360°, the hook of FIG. 5 has all of the advantages and relationships previously described. With end 46' terminating substantially short of head support surface 34, it is possible to tilt hook C to the position shown in FIG. 5 so that end 46' is directly aligned with opening 18 in link 12. The width of end 46' is preferably greater than the width of link opening 18 across side portion 16 thereof. Even with end 46' terminating well short of head bottom 34, the dimensioning of hook C and its relationship to the links is such that a cross link 22 cannot be displaced from hook C even in the rotated and tilted position shown in FIG. 5. The only way to remove cross link 22 from hook C after assembly is by disconnecting the circumferential side chain and then moving side link 12 to the interior of bowl 42 so that cross link 22 may pass such side link for removal from the hook.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A hook for interconnecting two links contained in two different chains comprising a head, a shank extending from said head and merging into a reversely curved bowl, said bowl merging into an end section which is spaced from said shank to define therewith a throat leading to said reversely curved bowl, said throat having a width just slightly larger than the diameter of one link whereas the bowl has a width larger than the combined diameters of the two links, whereby to assemble or disassemble the chains the two links are both positioned about the bowl for relative movement but for operation one link is maintained about said shank and thus extends into said throat to preclude removal of the other link positioned about said bowl.

2. The hook of claim 1 wherein said head has a support surface and one of said predetermined diameters measured along said shank from said support surface establishes a swivel line, said hook end portion extending past said swivel line toward said head.

3. The hook of claim 2 wherein said support surface has a peripheral edge and said hook end portion is spaced from said peripheral edge a distance substantially the same as the width of said throat.

4. The hook of claim 1 wherein said head has a support surface and said hook end portion extends adjacent said head, the distance from said shank adjacent said support surface to said hook end portion being greater than either of said predetermined diameters but less than their combined diameters.

5. The hook of claim 1 wherein said hook member has a substantially circular cross-sectional shape along said shank and bowl, and said hook end portion has a flat inner surface facing said shank.

6. The hook of claim 1 wherein one of said links comprises a side chain link on a side tire chain and the other of said links comprises a cross chain link on a cross chain extending substantially perpendicular to said side chain, said side chain link being received on said shank and normally bearing against said head, and said cross chain link being received on said bowl and thus extending into the space defined thereby.

7. The hook of claim 6 wherein said head has a support surface and said hook end portion has an end, said end extending into a common plane with said support surface.

8. The hook of claim 1 wherein said head has a support surface, one of said links being received on said shank against said support surface and extending into said throat toward said end portion, the other of said links being received on said bowl.

9. A hook for use in a tire chain apparatus having two circumferential side chains with interconnected elongated links of predetermined stock diameter and a plurality of peripherally spaced cross members with each such cross member having at least one link of predetermined stock diameter on both its ends, said hook comprising a head, a shank connected to and extending from said head, said shank merging into a reversely curved bowl having a circumferential extent greater than 180° and being wider than the combined predetermined stock diameters of the two links, said bowl merging into a terminal hook portion which is directly opposite to but spaced from said shank to define therewith a throat leading to said reversely curved bowl, said throat being only slightly wider than the predetermined stock diameter of either link, whereby to assemble and disassemble the tire chain both links are about the bowl of the hook to permit relative movement but for operation the side chain link is about the shank and thus extends into the throat while the cross chain link is about the loop and thus precluded from movement through such throat.

* * * * *